(12) United States Patent
Sato

(10) Patent No.: US 7,834,578 B2
(45) Date of Patent: Nov. 16, 2010

(54) LOAD DRIVING APPARATUS, VEHICLE, AND ABNORMALITY PROCESSING METHOD AT LOAD DRIVING APPARATUS

(75) Inventor: Ryoji Sato, Toyohashi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 988 days.

(21) Appl. No.: 11/547,044

(22) PCT Filed: Jan. 13, 2006

(86) PCT No.: PCT/JP2006/300794

§ 371 (c)(1),
(2), (4) Date: Oct. 3, 2006

(87) PCT Pub. No.: WO2006/095497

PCT Pub. Date: Sep. 14, 2006

(65) Prior Publication Data

US 2007/0158121 A1 Jul. 12, 2007

(30) Foreign Application Priority Data

Mar. 9, 2005 (JP) .............................. 2005-065495

(51) Int. Cl.
*H02P 27/04* (2006.01)
*B60K 1/00* (2006.01)

(52) U.S. Cl. ...................... 318/800; 318/801; 318/430; 318/434; 180/65.1; 180/65.3

(58) Field of Classification Search ................. 318/800, 318/801, 254.1, 268, 808, 809, 812, 430, 318/432, 434; 180/65.1, 65.2, 65.3, 65.4, 180/65.5, 337, 338; 363/123, 124, 131
See application file for complete search history.

(56) References Cited

U.S. PATENT DOCUMENTS

| 5,757,161 | A | 5/1998 | Ikkai et al. |
| 5,780,980 | A * | 7/1998 | Naito ......................... 318/139 |
| 6,060,859 | A | 5/2000 | Jonokuchi |
| 6,161,640 | A * | 12/2000 | Yamaguchi ................. 180/65.8 |
| 6,590,360 | B2 * | 7/2003 | Hirata et al. ................. 318/727 |
| 7,164,253 | B2 * | 1/2007 | Sato et al. .................... 318/801 |
| 7,199,537 | B2 * | 4/2007 | Okamura et al. ............ 318/139 |
| 2004/0145338 | A1 | 7/2004 | Nakamura et al. |

FOREIGN PATENT DOCUMENTS

| JP | 07-115788 A | 5/1995 |
| JP | 8-163702 A | 6/1996 |
| JP | 10-248107 A | 9/1998 |
| JP | 11-041980 A | 2/1999 |
| JP | 2000-166023 A | 6/2000 |
| JP | 2002-225578 A | 8/2002 |
| JP | 2003-111203 A | 4/2003 |

(Continued)

*Primary Examiner*—Walter Benson
*Assistant Examiner*—Thai Dinh
(74) *Attorney, Agent, or Firm*—Kenyon & Kenyon LLP

(57) ABSTRACT

When an ECU determines that the motor count of a motor generator exceeds a predetermined limit value, control is effected to set the torque of motor generator to zero. Further, when the ECU determines that motor count exceeds the predetermined limit value, voltage control of inverter input voltage is reduced by a predetermined level.

14 Claims, 11 Drawing Sheets

FOREIGN PATENT DOCUMENTS

| | | |
|---|---|---|
| JP | 2004-072892 A | 3/2004 |
| JP | 2004-166443 A | 6/2004 |
| JP | 2004-208409 A | 7/2004 |
| JP | 2004-229399 A | 8/2004 |
| JP | 2005-051895 A | 2/2005 |
| WO | WO 2005/013467 A1 | 2/2005 |

* cited by examiner

US 7,834,578 B2

LOAD DRIVING APPARATUS, VEHICLE, AND ABNORMALITY PROCESSING METHOD AT LOAD DRIVING APPARATUS

This is a 371 national phase application of PCT/JP2006/300794 filed Jan. 13, 2006, which claims priority to Japanese Patent Application No. 2005-065495 filed Mar. 9, 2005, the contents of which are incorporated herein by reference.

TECHNICAL FIELD

The present invention relates to a load driving apparatus, a vehicle, and an abnormality processing method at the load driving apparatus. Particularly, the present invention relates to a load driving apparatus including an up-conversion device boosting a DC (Direct Current) voltage from a DC power supply, a vehicle, and an abnormality processing method at the load driving apparatus.

BACKGROUND ART

Japanese Patent Laying-Open No. 2003-111203 discloses a drive gear for an automotive dynamo-electric machine that can suppress voltage fluctuations of the power source caused by the operating condition of the power-fed automotive dynamo-electric machine being switched. This drive gear for an automotive dynamo-electric machine includes a high-voltage power source system transferring power bidirectionally with an automotive dynamo-electric machine of high voltage via an inverter, a low-voltage power source system with a battery of low voltage generating voltage lower than that of the high-voltage power source system, a DC-DC converter arranged between the high-voltage power source system and low-voltage power source system to transfer power bidirectionally between the power source systems, and a control unit controlling the switching element in the DC-DC converter based on PWM (Pulse Width Modulation).

In the drive gear for an automotive dynamo-electric machine, the control unit feedback-controls the duty ratio of the switching element in the DC-DC converter such that the voltage of the high-voltage power source system converges to a predetermined target range. When the operating state of the automotive dynamo-electric machine switches between a power running operation and a regenerative operation, the control unit switches the maximum duty ratio of the switching element of the DC-DC converter such that the voltage and/or current of the low-voltage power source system comes within the battery tolerable range of the low-voltage power source system.

In other words, when the operating state of the automotive dynamo-electric machine is switched, the voltage/current of the low-voltage power source system will suddenly change in response to the quick change of the circuit state caused by the operating state switching, leading to the possibility of adversely affecting the battery of the low-voltage power source system and/or other components in the low-voltage system. Therefore, in the event of switching the transmission direction of the DC-DC converter in the drive gear for an automotive dynamo-electric machine, the maximum duty ratio of the switching element in the DC-DC converter is changed at the same time such that the voltage and/or current of the low-voltage power source system stays within the battery tolerable range of the low-voltage power source system. Thus, voltage variation in the power source system involved in the switching of the operating state of the automotive dynamo-electric machine can be suppressed.

In recent years, hybrid vehicles are attracting great attention from the standpoint of saving energy and environmental problems that have become a grave concern. A hybrid vehicle employs a battery, an inverter, and a motor driven by the inverter as the power source, in addition to a conventional engine. Some hybrid vehicles are known to further include a generator that generates electric power using the engine power, and an up-converter that boots and supplies to the inverter the voltage from the battery.

When excessive rotation of the motor occurs by, for example, a failure at the transmission provided at the output shaft of the motor that generates the motive power of the vehicle in a load driving apparatus incorporated in such a hybrid vehicle, control is effected to rapidly reduce the output torque of the motor in order to prevent motor damage. A sharp decrease in the motor output torque will cause a sudden decrease in the motor power consumption, whereby the demand-supply balance between the power consumed by the motor and the power supplied by the generator is temporarily disturbed. This may cause overvoltage (a voltage exceeding the breakdown voltage of the inverter) at the inverter input side.

Although the aforementioned Japanese Patent Laying-Open No. 2003-111203 discloses an approach to suppress voltage variation in the power source system, this approach may not prevent the overvoltage at the inverter input side that is caused by a sudden decrease in the motor torque, as set forth above. Since the voltage at the inverter input side begins to rise at the same time the motor torque begins to decrease abruptly, the approach disclosed in Japanese Patent Laying-Open No. 2003-111203 may not be able to suppress the voltage increase that occurs during the period starting from the sudden decrease in motor torque until switching the transmission direction of the converter. There is the possibility that occurrence of overvoltage cannot be prevented.

DISCLOSURE OF THE INVENTION

The present invention is directed to solving such problems, and an object is to provide a load driving apparatus that can prevent the inverter input voltage from attaining an overvoltage level when excessive rotation of the electric load occurs.

Another object of the present invention is to provide a vehicle incorporated with a load driving apparatus that can prevent the inverter input voltage from attaining an overvoltage level when excessive rotation of the electric load occurs.

A further object of the present invention is to provide an abnormality processing method at a load driving apparatus that prevents the inverter input voltage from attaining an overvoltage level when excessive rotation of the electric load occurs.

According to the present invention, a load driving apparatus includes a first rotating electric machine generating a drive force, a first driving device arranged between a first power supply line and the first rotating electric machine, driving the first rotating electric machine with supply of power from the first power supply line, power generation means connected to the first power supply line for supplying generated electric power to the first power supply line, a up-conversion device arranged between a second power supply line connected to a DC power source and the first power supply line to boost the voltage of the second power supply line for output to the first power supply line, and control means for outputting to the first driving device an instruction to reduce the torque generated by the first rotating electric machine when the revolution count of the first rotating electric machine exceeds a predetermined limit value. The control means outputs to the up-conversion device an instruction to reduce the boosting rate of the up-conversion device when the revolution count of the first rotating electric machine exceeds a predetermined sub-limit value that is at most the predetermined limit value.

In the load driving apparatus of the present invention, the control means effects control to reduce the torque of the first rotating electric machine for protection of the first rotating electric machine when the revolution count of the first rotating electric machine exceeds the predetermined limit value. In view of the supposed abrupt rise of voltage on the first power supply line by a temporary disturbance of the supply-demand balance between the power consumed by the first rotating electric machine and the power generated by the power generation means when the torque of the first rotating electric machine is reduced rapidly, the control means reduces the boosting rate of the up-conversion device relatively lower than the current value when the revolution count of the first rotating electric machine exceeds the predetermined sub-limit value that is at most the predetermined limit value. In other words, when control is effected to rapidly reduce the torque of the first rotating electric machine in response to excessive rotation of the first rotating electric machine, the voltage level of the first power supply line is set at a low level in advance.

Accordingly, application of overvoltage to the first driving device connected to the first power supply line can be prevented in the load driving apparatus of the present invention.

Preferably, the power generation means includes a second rotating electric machine having a power generating function, and a second driving device arranged between the first power supply line and the second rotating electric machine, driving the second rotating electric machine. In the case where the second rotating electric machine is currently halting or in a power running operation when the revolution count of the first rotating electric machine exceeds the predetermined sub-limit value, the control means maintains the boosting rate of the up-conversion device without outputting to the up-conversion device the instruction to reduce the boosting rate of up-conversion device.

In the case where the second rotating electric machine is currently halting or in a power running operation when the revolution count of the first rotating electric machine exceeds the predetermined sub-limit value, the control means of the load driving apparatus does not reduce the boosting rate of the up-conversion device. In other words, since the voltage on the first power supply line will not be boosted if the second rotating electric machine is currently halting or in a power running operation, the control means maintains the boosting rate of the up-conversion device.

By virtue of the load driving apparatus, unnecessary voltage variation at the first power supply line can be suppressed.

Preferably, the control means outputs to the first driving device an instruction to set the torque generated by the first rotating electric machine to zero when the revolution count of the first rotating electric machine exceeds the predetermined limit value.

In the load driving apparatus, the control means effects control to set the torque generated by the first rotating electric machine to zero when the revolution count of the first rotating electric machine exceeds the predetermined limit value. Therefore, the first rotating electric machine can be reliably protected according to the load driving apparatus.

Preferably, the control means outputs the instruction to reduce the boosting rate of the up-conversion device in the case where the power consumed by the first rotating electric machine exceeds a first threshold value when the revolution count of the first rotating electric machine exceeds the predetermined sub-limit value.

Further preferably, the control means outputs the instruction to reduce the boosting rate of the up-conversion device in the case where the torque of the first rotating electric machine exceeds a second threshold value when the revolution count of the first rotating electric machine exceeds the predetermined sub-limit value.

Further preferably, the control means outputs the instruction to reduce the boosting rate of the up-conversion device in the case where the current flowing through the first rotating electric machine exceeds a third threshold value when the revolution count of the first rotating electric machine exceeds the predetermined sub-limit value.

When the revolution count of the first rotating electric machine exceeds the predetermined sub-limit value, the control means in the load driving apparatus reduces the boosting rate of the up-conversion device relatively lower than the current value only in the case where the power consumed by the first rotating electric machine exceeds the first threshold value, the torque of the first rotating electric machine exceeds the second threshold value, or the current flowing through the first rotating electric machine exceeds the third threshold value. In other words, when the power consumption, the torque, or the current of the first rotating electric machine is low in the event of the revolution count of the first rotating electric machine exceeding the sub-limit value, the voltage of the first power supply line will not be boosted abruptly even if control is effected to reduce the torque of the first rotating electric machine when the revolution count of the first rotating electric machine exceeds the limit value. Therefore, the voltage level of the first power supply line is not reduced in advance. By virtue of the load driving apparatus, the voltage level of the first power supply line can be prevented from varying unnecessarily.

A vehicle according to the present invention includes the load driving apparatus set forth above, a wheel driven by the drive force generated by the first rotating electric machine, and an internal combustion engine arranged connectable to the second rotating electric machine, outputting a rotation force to the second rotating electric machine, as necessary, when connected to the second rotating electric machine.

When the revolution count of the first rotating electric machine increases by a failure or the like at the transmission coupled to the first rotating electric machine in the vehicle of the present invention to exceed a predetermined limit value, the control means of the load driving apparatus effects control to reduce the torque of the first rotating electric machine for protection of the first rotating electric machine. In view of the supposed abrupt rise of voltage on the first power supply line by a temporary disturbance of the supply-demand balance between the power consumed by the first rotating electric machine and the power generated by the second rotating electric machine connected to the internal combustion engine when the torque of the first rotating electric machine is reduced rapidly, the control means reduces the boosting rate of the up-conversion device relatively lower than the current value when the revolution count of the first rotating electric machine exceeds a predetermined sub-limit value that is at most the predetermined limit value. In other words, the voltage level of the first power supply line is reduced in advance when control is effected to rapidly reduce the torque of the first rotating electric machine in response to excessive rotation of the first rotating electric machine.

In accordance with the vehicle of the present invention, application of overvoltage to the first driving device connected to the first power supply line can be prevented. As a result, the reliability of the vehicle is improved.

An abnormality processing method of the present invention is an abnormality processing method at a load driving apparatus. The load driving apparatus includes a first rotating electric machine generating a drive force, a first driving device arranged between a first power supply line and the first rotating electric machine, driving the first rotating electric machine with the power from the first power supply line, power generation means connected to the first power supply line for supplying generated electric power to the first power supply line, and a up-conversion device arranged between a second power supply line to which a DC power source is connected and the first power supply line to boost the voltage of the second power supply line for output to the first power supply line. The abnormality processing method includes a first step of determining whether the revolution count of the first rotating electric machine exceeds a predetermined sub-limit value, a second step of generating an instruction to reduce the boosting rate of the up-conversion device when determination is made that the revolution count of the first rotating electric machine exceeds the predetermined sub-limit value, a third step of controlling the boosting rate of the up-conversion device based on the instruction generated at the second step, a fourth step of determining whether the revolution count of the first rotating electric machine exceeds a predetermined limit value that is at least the predetermined sub-limit value, a fifth step of generating an instruction to reduce the torque generated by the first rotating electric machine when determination is made that the revolution count of the first rotating electric machine exceeds the predetermined limit value, and a sixth step of controlling the torque of the first rotating electric machine based on the instruction generated at the fifth step.

When determination is made that the revolution count of the first rotating electric machine exceeds the predetermined limit value in the abnormality processing method of the load driving apparatus of the present invention, control is effected to reduce the torque of the first rotating electric machine for protection of the first rotating electric machine. In view of the supposed abrupt rise of voltage on the first power supply line by a temporary disturbance of the supply-demand balance between the power consumed by the first rotating electric machine and the power generated by the power generation means when the torque of the first rotating electric machine is reduced suddenly, the boosting rate of the up-conversion device is reduced relatively lower than the current value when determination is made that the revolution count of the first rotating electric machine exceeds a predetermined sub-limit value that is at most the predetermined limit value in the present abnormality processing method. In other words, the voltage level of the first power supply line is reduced in advance when control is effected to suddenly reduce the torque of the first rotating electric machine in response to the excessive rotation of the first rotating electric machine.

In accordance with the abnormality processing method of the present invention, application of overvoltage to the first driving device connected to the first power supply line can be prevented.

Preferably, the power generation means includes a second rotating electric machine having a power generating function, and a second driving device arranged between the first power supply line and the second rotating electric machine, driving the second rotating electric machine. The abnormality processing method further includes a seventh step of determining whether the second rotating electric machine is currently halting or in a power running operation when determination is made that the revolution count of the first rotating electric machine exceeds the predetermined sub-limit value at the first step, and bypasses the second and third steps when determination is made that the second rotating electric machine is currently halting or in the power running operation.

In the abnormality processing method, the boosting rate of the up-conversion device is not reduced when determination is made that the revolution count of the first rotating electric machine exceeds the predetermined sub-limit value and determination is made that the second rotating electric machine is currently halting or in the power running operation. In other words, the boosting rate of the up-conversion device is maintained since the voltage on the first power supply line will not be boosted when the second rotating electric machine is currently halting or in the power running operation.

In accordance with the abnormality processing method, unnecessary voltage variation of the first power supply line can be suppressed.

Preferably in the fifth step, an instruction to set the torque generated by the first rotating electric machine to zero is generated when determination is made that the revolution count of the first rotating electric machine exceeds the predetermined limit value at the fourth step.

When determination is made that the revolution count of the first rotating electric machine exceeds the predetermined limit value in the present abnormality processing method, control is effected to set the torque generated by the first rotating electric machine to zero. By virtue of the abnormality processing method, the first rotating electric machine can be protected reliably.

Preferably, the abnormality processing method further includes an eighth step of determining whether the power consumed by the first rotating electric machine exceeds a first threshold value. In the second step, the instruction to reduce the boosting rate is generated in the case where determination is made that the power consumed by the first rotating electric machine exceeds the first threshold value at the eighth step when determination is made that the revolution count of the first rotating electric machine exceeds the predetermined sub-limit value.

Further preferably, the abnormality processing method further includes a ninth step of determining whether the torque of the first rotating electric machine exceeds a second threshold value. In the second step, the instruction to reduce the boosting rate is generated in the case where determination is made that the torque of the first rotating electric machine exceeds the second threshold value at the ninth step when determination is made that the revolution count of the first rotating electric machine exceeds the predetermined sub-limit value.

Preferably, the abnormality processing method further includes a tenth step of determining whether the current flowing through the first rotating electric machine exceeds a third threshold value. In the second step, the instruction to reduce the boosting rate is generated in the case where determination is made that the current flowing through the first rotating electric machine exceeds the third threshold value at the tenth step when determination is made that the revolution count of the first rotating electric machine exceeds the predetermined sub-limit value.

When determination is made that the revolution count of the first rotating electric machine exceeds the predetermined sub-limit value in accordance with the abnormality processing method, the boosting rate of the up-conversion device is reduced relatively lower than the current value only in the case where the power consumed by the first rotating electric machine exceeds the first threshold value, the torque of the first rotating electric machine exceeds the second threshold value, or the current flowing through the first rotating electric machine exceeds the third threshold value. In other words, when the power consumption, the torque, or the current of the first rotating electric machine is low in the event of the revolution count of the first rotating electric machine exceeding the sub-limit value, the voltage of the first power supply line will not be boosted abruptly even if control is effected to reduce the torque of the first rotating electric machine when the revolution count of the first rotating electric machine exceeds the limit value. Therefore, the voltage level of the first power supply line is not reduced in advance. By the present abnormality processing method, the voltage level of the first power supply line can be prevented from varying unnecessarily in accordance with the abnormality processing method.

By virtue of the present invention, damage of the electric load can be prevented since control is effected to rapidly reduce the torque of the electric load when excessive rotation of the electric load occurs. Since the inverter input voltage is reduced in advance when control is effected to rapidly reduce the torque of the electric load, application of overvoltage to the inverter can be prevented.

BEST MODES FOR CARRYING OUT THE INVENTION

Figure 1:
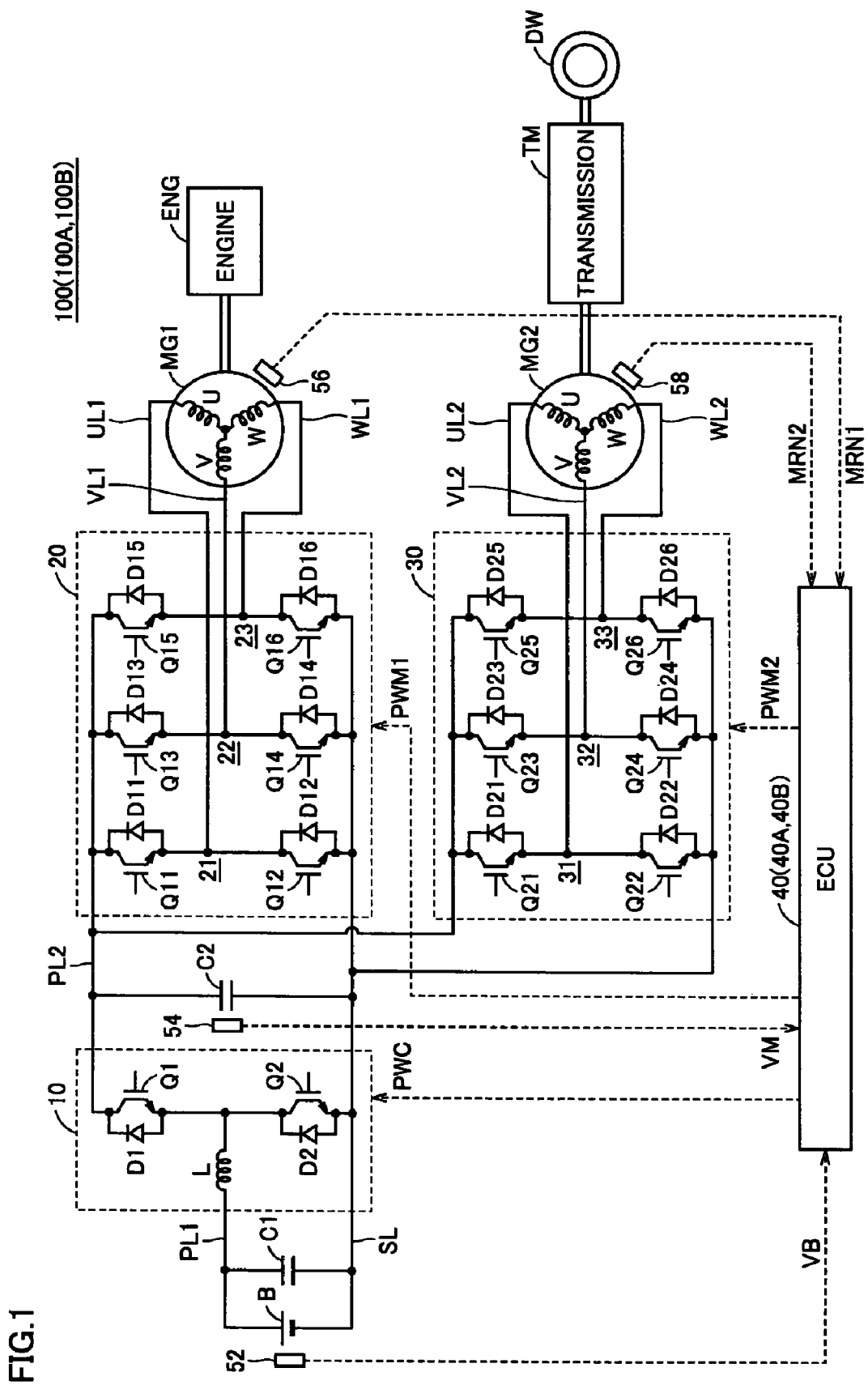
FIG. 1 is a schematic block diagram of a hybrid vehicle indicated as an example of a vehicle in which a load driving apparatus according to a first embodiment of the present invention is incorporated.

Embodiments of the present invention will be described in detail with reference to the drawings. The same or corresponding elements in the drawings have the same reference characters allotted, and description thereof will not be repeated.

First Embodiment

FIG. 1 is a schematic block diagram of a hybrid vehicle indicated as an example of a vehicle in which a load driving apparatus according to a first embodiment of the present invention is incorporated. Referring to FIG. 1, this hybrid vehicle 100 includes a battery B, an up-converter 10, inverters 20 and 30, an ECU (Electronic Control Unit) 40, motor generators MG1 and MG2, an engine ENG, a transmission TM, a driving wheel DW, capacitors C1 and C2, voltage sensors 52 and 54, revolution sensors 56 and 58, power supply lines PL1 and PL2, a ground line SL, U-phase lines ULL and UL2, V-phase lines VL1 and VL2, and W-phase lines WL1 and WL2.

Motor generators MG1 and MG2 are rotating electric machines, and formed of 3-phase AC (alternating current) synchronous motor-generators. Motor generator MG1 generates a 3-phase AC voltage using the power of engine ENG to provide the generated 3-phase AC voltage to inverter 20. Motor generator MG1 also generates a drive force by the 3-phase AC voltage from inverter 20 to start engine ENG.

Motor generator MG2 generates a driving torque of a vehicle by the 3-phase AC voltage from inverter 30 to provide the generated driving torque to transmission TM. Motor generator MG2 receives the rotation force from transmission TM to generate and provide to inverter 30 a 3-phase AC voltage in a vehicle regenerative braking mode.

Transmission TM is provided between motor generator MG2 and driving wheel DW to effect a speed change in the output from motor generator MG2 for provision to driving wheel DW. Transmission TM provides the rotation force of driving wheel DW to motor generator MG2 in a vehicle regenerative braking mode.

Battery B that is the DC power source is a battery that can be charged, and is formed of, for example, a nickel hydrogen or lithium-ion secondary battery. Battery B outputs the generated DC voltage to up-converter 10, and is charged by the DC voltage output from up-converter 10.

Up-converter 10 includes a reactor L, power transistors Q1 and Q2, and diodes D1 and D2. Reactor L has one end connected to power supply line PL1, and the other end connected to the node of power transistors Q1 and Q2. Power transistors Q1 and Q2 are formed of IGBTs (Insulated Gate Bipolar Transistor), for example. Power transistors Q1 and Q2 are connected in series between power supply line PL2 and ground line SL to receive a signal PWC from ECU 40 at its base. Diodes D1 and D2 to conduct current from the emitter side to the collector side are connected across the collector and emitter of power transistors Q1 and Q2, respectively.

Inverter 20 includes a U-phase arm 21, a V-phase arm 22, and W-phase arm 23. U-phase arm 21, V-phase arm 22 and W-phase arm 23 are connected in parallel between power supply line PL2 and ground line SL. U-phase arm 21 is formed of power transistors Q11 and Q12 connected in series. V-phase arm 22 is formed of power transistors Q13 and Q14 connected in series. W-phase arm 23 is formed of power transistors Q15 and Q16 connected in series. Each of power transistors Q11-Q16 is formed of an IGBT, for example. Diodes D1-D16 to conduct current from the emitter side to the collector side are connected across the collector and emitter of power transistors Q11-Q16, respectively. The connection node of each power transistor in each phase arm is connected via respective U-phase line UL1, V-phase line VL1 and W-phase line WL1 to respective coil ends opposite to the side of the neutral points of each phase coil of motor generator MG1.

Inverter 30 has a configuration similar to that of inverter 20, and includes a U-phase arm 31, a V-phase arm 32, and W-phase arm 33. The connection node of each power transistor in each phase arm is connected via respective U-phase line UL2, V-phase line VL2 and W-phase line WL2 to respective coil ends opposite to the side of the neutral point of each phase coil of motor generator MG2.

Capacitor C1 is connected between power supply line PL1 and ground line SL to smooth the voltage variation across power supply line PL1 and ground line SL. Capacitor C2 is connected between power supply line PL2 and ground line SL to smooth the voltage variation across power supply line PL2 and ground line SL.

Up-converter 10 boosts the DC voltage supplied from battery B via power supply line PL1 to provide the boosted voltage onto power supply line PL2. More specifically, up-converter 10 responds to signal PWC from ECU 40 to store the flowing current according to the switching operation of power transistor Q2 as the magnetic field energy at reactor L to boost the DC voltage from battery B, and provides the boosted voltage onto power supply line PL2 via diode D1 in synchronization with the OFF timing of power transistor Q2. Up-converter 10 also responds to signal PWC from ECU 40 to down-convert the DC voltage from inverter 20 and/or 30 via power supply line PL2 to charge battery B.

Inverter 20 responds to a signal PWM1 from ECU 40 to convert the 3-phase AC voltage generated by motor generator MGI upon receiving the power from engine ENG into the DC voltage, and provides the converted DC voltage onto power supply line PL2. Inverter 20 also responds to signal PWM1 from ECU 40 to convert the DC voltage supplied from power supply line PL2 into 3-phase AC voltage to drive motor generator MG1.

Inverter 30 responds to a signal PWM2 from ECU 40 to convert the DC voltage supplied from power supply line PL2 into 3-phase AC voltage to drive motor generator MG2. Accordingly, motor generator MG2 is driven to generate a torque specified by a torque control value. In a vehicle regenerative braking mode, inverter 30 converts the 3-phase AC voltage generated by motor generator MG2 using the rotation force received from driving wheel DW via transmission TW into DC voltage based on signal PWM2 from ECU 40, and outputs the converted DC voltage onto power supply line PL2.

Voltage sensor 52 detects voltage VB output from battery B and provides the detected voltage VB to ECU 40. Voltage sensor 54 detects the voltage across the terminals of capacitor C2, i.e. output voltage VM of up-converter 10 (corresponding to the input voltage of inverters 20 and 30; the same applies hereinafter), and outputs the detected voltage VM to ECU 40. Revolution sensor 56 detects a motor count MRN1 of motor generator MG1 and outputs the detected motor count MRN1 to ECU 40. Revolution sensor 58 detects a motor count MRN2 of motor generator MG2, and outputs the detected motor count MRN2 to ECU 40.

ECU 40 generates signal PWC to drive up-converter 10 based on torque control values TR1 and TR2 of motor generators MG1 and MG2, voltages VB and VM from voltage sensors 52 and 54, and motor counts MRN1 and MRN2 from revolution sensors 56 and 58 to output the generated signal PWC to up-converter 10.

Signal PWC serves to drive up-converter 10 when up-converter 10 converts DC voltage from battery B into voltage VM. ECU 40 generates signal PWC to drive up-converter 10 such that voltage VM attains voltage control Vcom when up-converter 10 is to convert DC voltage from battery B into voltage VM.

Further, ECU 40 generates signal PWM1 to drive motor generator MG1 based on voltage VM from voltage sensor 54, and motor current MCRT1 and torque control value TR1 of motor generator MG1 to output the generated signal PWM1 to inverter 20. ECU 40 generates signal PWM2 to drive motor generator MG2 based on voltage VM from voltage sensor 54, and a motor current MCRT2 and torque control value TR2 of motor generator MG2 to output the generated signal PWM2 to inverter 30. Each of motor currents MCRT1 and MCRT2 is detected by a current sensor not shown.

ECU 40 determines whether the revolution count of motor generator MG2 exceeds a predetermined limit value based on motor count MRN2 from revolution sensor 58. When determination is made that motor count MRN2 exceeds a predetermined limit value, ECU 40 sets torque control value TR2 of motor generator MG2 to zero for protection of motor generator MG2.

When the torque of motor generator MG2 is reduced rapidly by setting torque control value TR2 of motor generator MG2 to zero, the power consumed by motor generator MG2 is rapidly reduced. Accordingly, the supply-demand balance between the power consumed by motor generator MG2 and the power generated by motor generator MG1 is temporarily disturbed, whereby the voltage level of power supply line PL2 increases rapidly. In order to prevent generation of overvoltage towards inverters 20 and 30 caused by this voltage increase, ECU 40 sets torque control value TR2 of motor generator MG2 to zero and controls up-converter1O such that the boosting rate of up-converter 10 is reduced relatively lower than the current value when determination is made that motor count MRN2 exceeds a predetermined limit value. Specifically, ECU 40 reduces voltage control Vcom of voltage VM by a predetermined level and generates signal PWC to drive up-converter 10. The method of generating this signal PWM will be described afterwards.

Figure 2:
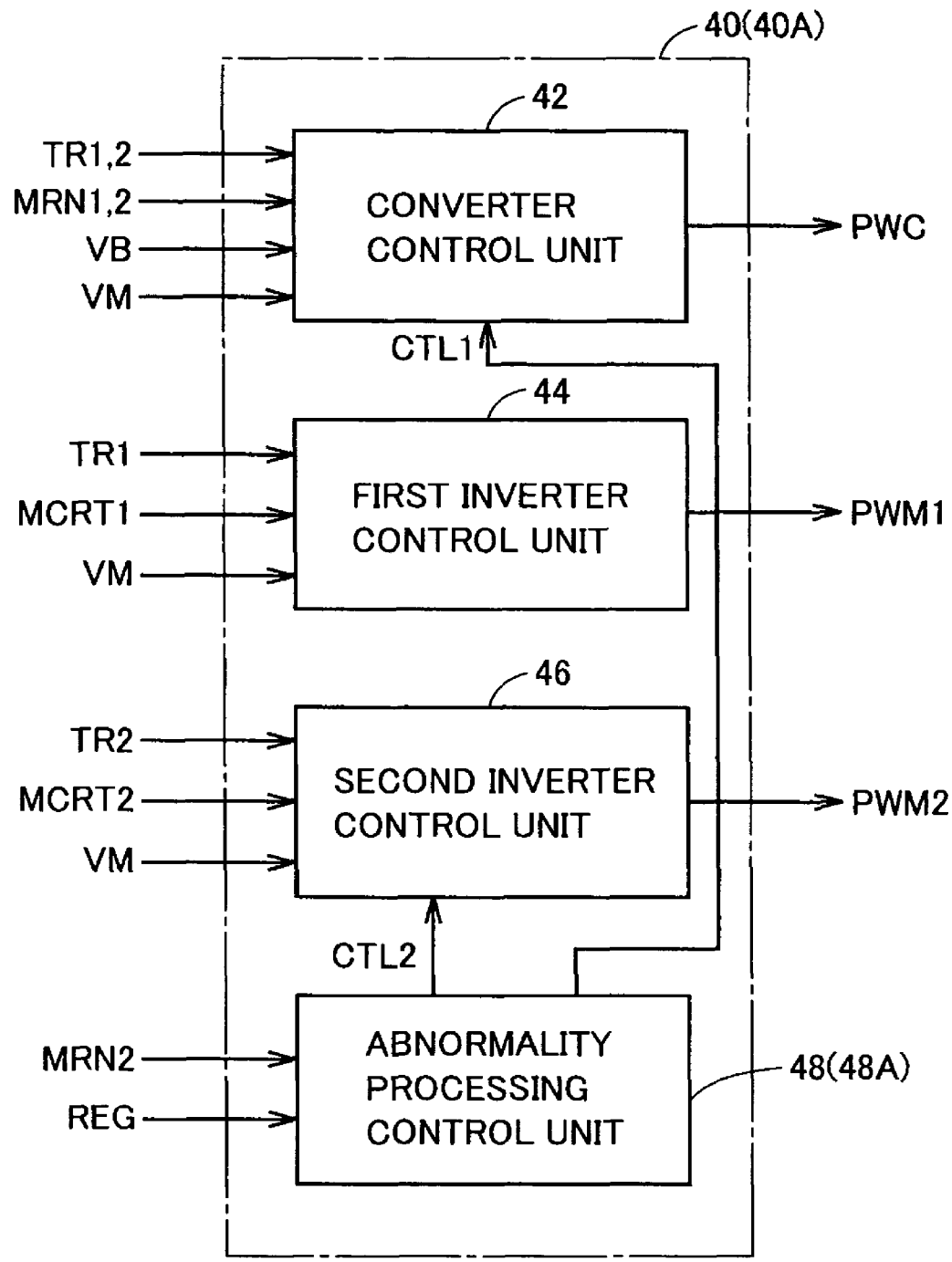
FIG. 2 is a functional block diagram of an ECU of FIG. 1.

FIG. 2 is a functional block diagram of ECU 40 of FIG. 1. Referring to FIG. 2, ECU 40 includes a converter control unit 42, first and second inverter control units 44 and 46, and an abnormality processing control unit 48. Converter control unit 42 generates signal PWC to turn on/off power transistors Q1 and Q2 of up-converter 10 in accordance with a method that will be described afterwards, based on voltages VB and VM from voltage sensors 52 and 54, torque control values TR1 and TR2, and motor counts MRN1 and MRN2 from revolution sensors 56 and 58. The generated signal PWC is output to up-converter 10.

Converter control unit 42 reduces the boosting rate of up-converter 10 by a predetermined level and generates signal PWC when a control signal CTL 1 of an H (logical high) level is received from abnormality processing control unit 48. Specifically, converter control unit 42 reduces voltage control Vcom that is the target value of voltage VM by a predetermined level. Converter control unit 42 will be described in detail afterwards.

First inverter control unit 44 generates signal PWM1 to turn on/off power transistors Q11-Q16 of inverter 20 based on torque control value TR1 and motor current MCRT1 of motor generator MG1, and voltage VM from voltage sensor 54. The generated signal PWM1 is output to inverter 20.

Second inverter control unit 46 generates signal PWM2 to turn on/off power transistors Q21-Q26 of inverter 30 based on torque control value TR2 and motor current MCRT2 of motor generator MG2, and voltage VM from voltage sensor 54. The generated signal PWM2 is output to inverter 30.

Second inverter control unit 46 sets torque control value TR2 to zero when a control signal CTL2 of an H level is received from abnormality processing control unit 48. Specifically, when control signal CTL2 is at an H level, second inverter control unit 46 generates signal PWM2 to set the torque of motor generator MG2 to zero, and outputs the generated signal PWM2 to inverter 30.

Abnormality processing control unit 48 receives motor count MRN2 from revolution sensor 58 to compare the received motor count MRN2 with a predetermined limit value that is set in advance. When motor count MRN2 exceeds the limit value, abnormality processing control unit 48 determines that motor generator MG2 is rotating excessively. Then, abnormality processing control unit 48 outputs control signal CTL2 of an H level to second inverter control unit 46 in order to set the torque of motor generator MG2 to zero.

Further, in order to prevent generation of overvoltage on power supply line PL2 caused by a sudden reduction in the torque of motor generator MG2, abnormality processing control unit 48 outputs control signal CTL1 of an H level to converter control unit 42 to reduce the boosting rate of up-converter 10. Abnormality processing control unit 48 provides control signals CTL1 and CTL2 of an L (logical low) level to converter control unit 42 and second inverter control unit 46, respectively, when motor count MRN2 is equal to or less than the limit value. A signal REG will be described afterwards.

Figure 3:
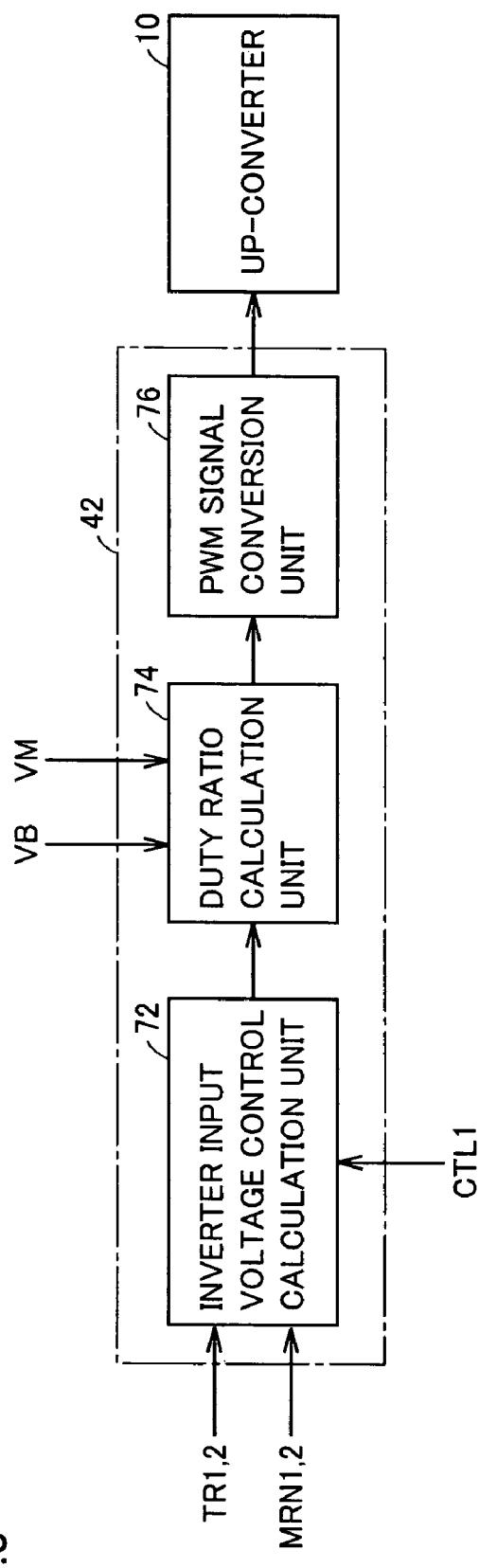
FIG. 3 is a detailed functional block diagram of a converter control unit of FIG. 2.

FIG. 3 is a detailed functional block diagram of converter control unit 42 of FIG. 2. Referring to FIG. 3, converter control unit 42 includes an inverter input voltage control calculation unit 72, a duty ratio calculation unit 74, and a PWM signal conversion unit 76.

Inverter input voltage control calculation unit 72 calculates an optimum value (target value) of an inverter input voltage VM, i.e. voltage control Vcom, based on torque control values TR1 and TR2 and motor counts MRN1 and MRN2, and outputs calculated voltage control Vcom to duty ratio calculation unit 74.

Input voltage control calculation unit 72 reduces calculated voltage control Vcom by a predetermined level set in advance when control signal CTL1 of an H level is received from abnormality processing control unit 48, not shown, and outputs the calculated voltage control Vcom to duty ratio calculation unit 74.

Duty ratio calculation unit 74 calculates a duty ratio to set input voltage VM of inverters 20 and 30 to voltage control Vcom based on voltages VB and VM from voltage sensors 52 and 54 and voltage control Vcom from input voltage control calculation unit 72. The calculated duty ratio is output to PWM signal conversion unit 76.

PWM signal conversion unit 76 generates signal PWC to turn on/off power transistors Q1 and Q2 of up-converter 10 based on the duty ratio received from duty ratio calculation unit 74. The generated signal PWC is output to power transistors Q1 and Q2 of up-converter 10.

Figure 4:
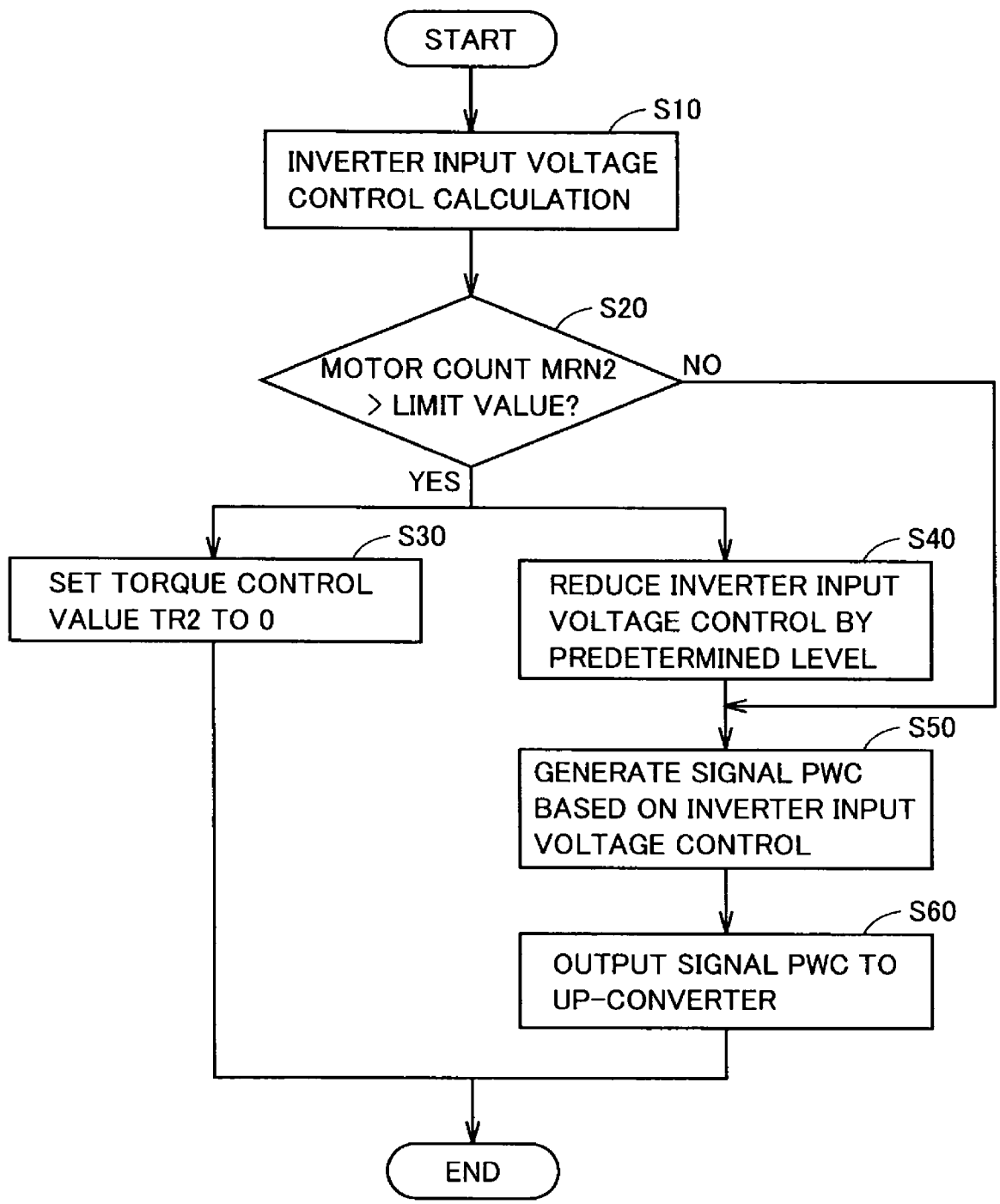
FIG. 4 is a flow chart related to abnormality processing when excessive rotation occurs at a motor generator MG2.

FIG. 4 is a flow chart related to abnormality processing when excessive rotation occurs at motor generator MG2. Referring to FIG. 4, converter control unit 42 calculates voltage control Vcom of input voltage VM of inverters 20 and 30 based on torque control values TR1 and TR2 of motor generators MG1 and MG2, and motor counts MRN1 and MRN2 from revolution sensors 56 and 58 (step S10).

Abnormality processing control unit 48 determines whether motor count MRN2 of motor generator MG2 exceeds a predetermined limit value that has been set in advance (step S20). When determination is made that motor count MRN2 exceeds the limit value (YES at step S20), abnormality processing control unit 48 outputs control signal CTL2 of an H level to second inverter control unit 46. In response, second inverter control unit 46 generates signal PWM2 with torque control value TR2 as zero according to control signal CTL2 of an H level (step S30).

When determination is made that motor count MRN2 exceeds the limit value (YES at step S20), abnormality processing control unit 48 outputs control signal CTL1 of an H level to converter control unit 42. In response to control signal CTL1 of an H level, converter control unit 42 reduces voltage control Vcom of inverter input voltage VM by a predetermined level (step S40). Converter control unit 42 generates signal PWC to turn on/off power transistors Q1 and Q2 of up-converter 10 based on the reduced voltage control Vcom (step S50). The generated signal PWC is output to power transistors Q1 and Q2 of up-converter 10 (step S60).

When determination is made that motor count MRN2 is equal to or lower than the limit value at step S20 (NO at step S20), abnormality processing control unit 48 outputs control signal CTL1 of an L level to converter control unit 42. Converter control unit 42 generates signal PWC based on voltage control Vcom calculated at step S10 without reducing voltage control Vcom (step S50). The generated signal PWC is output to power transistors Q1 and Q2 of up-converter 10 (step S60).

Figure 5:
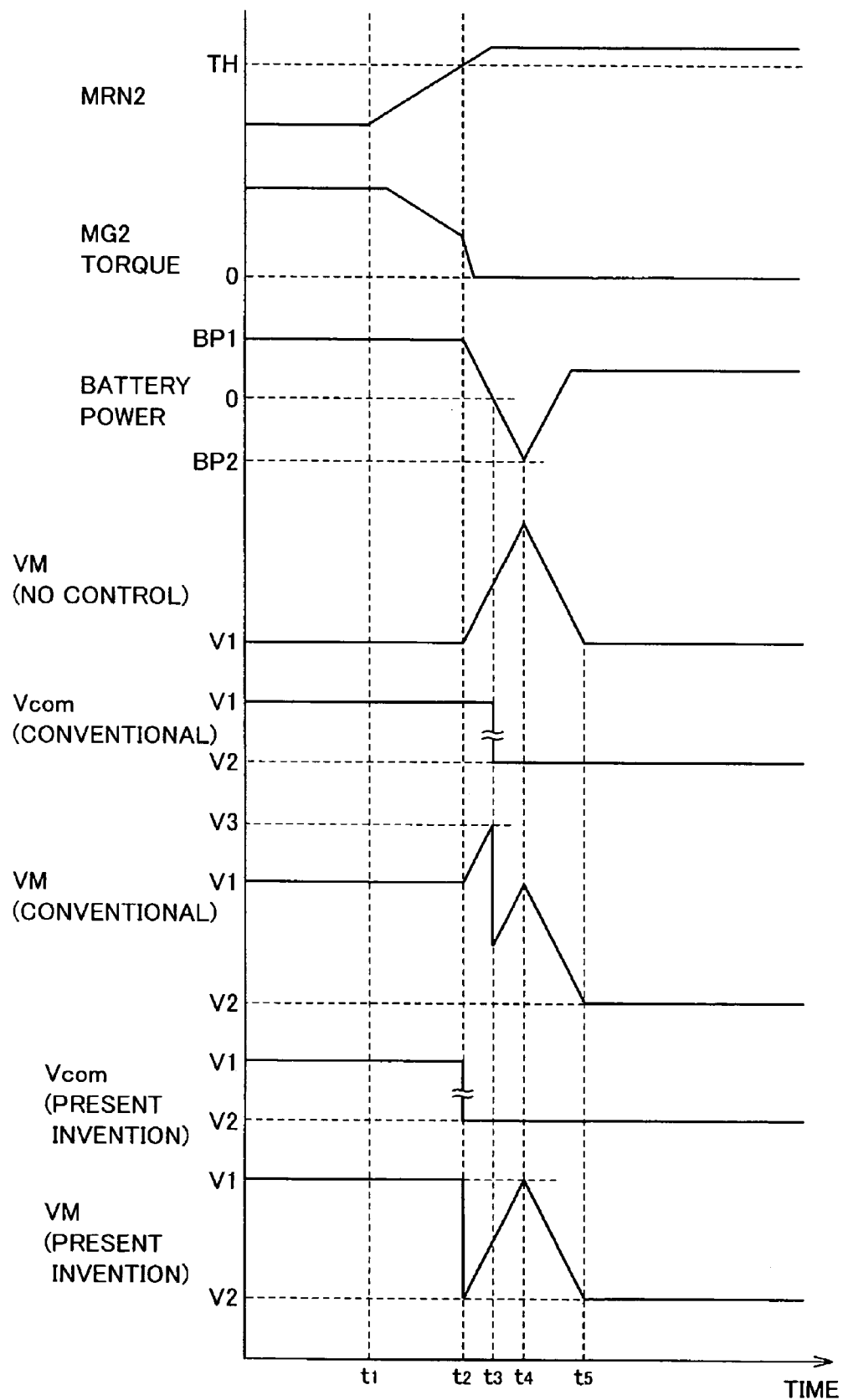
FIG. 5 is an operational waveform diagram when excessive rotation occurs at motor generator MG2.

FIG. 5 is an operation waveform diagram when excessive rotation occurs at motor generator MG2. For the sake of comparison, FIG. 5 shows the voltage waveform when control to suppress variation in voltage VM is not effected at all (no control), and when the boosting rate of up-converter 10 is reduced simultaneous to switching the transmission direction of up-converter 10 (conventional case) in the event of torque reduction control of motor generator MG2 in response to excessive rotation of motor generator MG2.

At time t1 in FIG. 5, when motor count MRN2 of motor generator MG2 begins to rise by a failure at the clutch of transmission TM, for example, the torque of motor generator MG2 begins to decrease.

When motor count MRN2 exceeds a predetermined limit value TH at time t2, torque control value TR2 of motor generator MG2 is set to zero, whereby the torque of motor generator MG2 changes abruptly to 0. Accordingly, the amount of power consumed by motor generator MG2 is rapidly reduced. The battery power (indicating the input and output power of battery B; representing a power running (discharge) state when positive, and a regenerative (charging) state when negative) gradually decreases from BP1 to become negative at the point of time t3 (switch from power running state to regenerative state). The battery power attains the smallest value BP2 at time t4, and is then controlled to stay within a predetermined range.

When control to suppress variation in voltage VM is not effected (no control) as shown in FIG. 5, voltage VM rises at time t2 to attain the highest level at time t4 where the battery power is lowest. In other words, voltage VM rapidly rises reflecting the torque reduction control executed in response to excessive rotation of motor generator MG2. As a result, an overvoltage exceeding the breakdown voltage of inverters 20 and 30 may be generated.

In the case where the boosting rate of up-converter 10 is reduced simultaneous to switching the transmission direction of up-converter 10 (conventional case), voltage control Vcom of voltage VM is reduced to V2 from V1 at time t3 when the transmission direction of up-converter 10 is switched. Accordingly, voltage VM is reduced at time t3, so that increasing extent of voltage VM is suppressed as compared to the case where control to suppress variation in voltage VM is not effected (no control).

However, voltage VM rises during the period from time t2 when the torque of motor generator MG2 begins to decrease abruptly until time t3 when the transmission direction of up-converter 10 is switched. In other words, voltage VM rises reflecting the torque reduction control executed in response to excessive rotation of motor generator MG2 even by the conventional method that can suppress variation in voltage VM.

As a result, an overvoltage exceeding the breakdown voltage of inverters 20 and 30 may be generated.

In accordance with the first embodiment of the present invention, voltage control Vcom of voltage VM is immediately reduced from V1 to V2 that is lower than V1 by a predetermined level in response to an excess of motor count MRN2 over predetermined limit value TH at time t2. Accordingly, voltage VM is reduced at time t2. Voltage VM will not rise as high as the level of overvoltage that exceeds the breakdown voltage of inverters 20 and 30 even at time t4 when voltage VM is highest.

According to the first embodiment set forth above, the torque of motor generator MG2 is reduced abruptly to protect motor generator MG2 when motor generator MG2 rotates excessively. When excessive rotation of motor generator MG2 is detected, the boosting rate of up-converter 10 is immediately reduced. Therefore, overvoltage on power supply line PL2 that may occur reflecting the torque reduction control of motor generator MG2 can be prevented.

Although ECU40 executes torque reduction control to set torque control value TR2 of motor generator MG2 to zero and also controls up-converter 10 such that the boosting rate thereof is reduced when determination is made that motor count MRN2 exceeds a predetermined limit value, the limit value of motor count MRN2 directed to reducing the boosting ratio of up-converter 10 may be set lower than the predetermined limit value used to execute torque reduction control. In other words, ECU 40 may execute torque reduction control of motor generator MG2 based on a predetermined limit value of motor count MRN2, and execute control to reduce the boosting rate of up-converter 10 based on a predetermined sub-limit value that is at most the predetermined limit value. Accordingly, generation of overvoltage can be prevented reliably.

Second Embodiment

Even when excessive rotation of motor generator MG2 occurs and torque reduction control of motor generator MG2 is executed, increase of voltage VM reflecting torque reduction control of motor generator MG2 will not occur if motor generator MG1 is currently halting or in a power running operation. In the second embodiment, the boosting rate of up-converter 10 is not reduced and will be maintained if motor generator MG1 is currently halting or in a power running operation when excessive rotation of motor generator MG2 occurs. In the second embodiment, the limit value of motor count MRN2 to reduce the boosting rate of up-converter 10 is set lower than the limit value of motor count MRN2 to execute the torque reduction control of motor generator MG2. Thus, thorough protection against inverter overvoltage is achieved.

Referring to FIGS. 1 and 2 again, a hybrid vehicle 100A incorporating a load driving apparatus according to the second embodiment is based on the configuration of hybrid vehicle 100 of the first embodiment, and includes an ECU 40A instead of ECU 40. ECU 40A is based on the configuration of ECU 40 of the first embodiment, and includes an abnormality processing control unit 48A instead of abnormality processing control unit 48.

Abnormality processing control unit 48A receives motor count MRN2 from revolution sensor 58, and compares the received motor count MRN2 with a preset sub-limit value. Abnormality processing control unit 48A also determines whether motor generator MG1 is currently halting or in a power running operation based on a signal REG that indicates whether motor generator MG1 is in a regenerative power generation mode. Specifically, when signal REG is at an L level, abnormality processing control unit 48A determines that motor generator MG1 is not in a regenerative operation, and is currently halting or in a power running operation. Abnormality processing control unit 48A outputs control signal CTL1 of an L level to converter control unit 42 when motor generator MG1 is currently halting or in a power running operation in the event of motor count MRN2 of motor generator MG2 exceeding the sub-limit value.

Abnormality processing control unit 48A compares motor count MRN2 from revolution sensor 58 with a preset limit value. When motor count MRN2 exceeds the limit value, abnormality processing control unit 48A outputs control signal CTL2 of an H level to second inverter control unit 46 to set the torque of motor generator MG2 to zero.

The sub-limit value is set lower than the limit value. Accordingly, overvoltage on power supply line PL2 that may occur reflecting the torque reduction control of motor generator MG2 can be completely eliminated since the boosting rate of up-converter 10 is reduced before the torque of motor generator MG2 is rapidly reduced.

Figure 6:
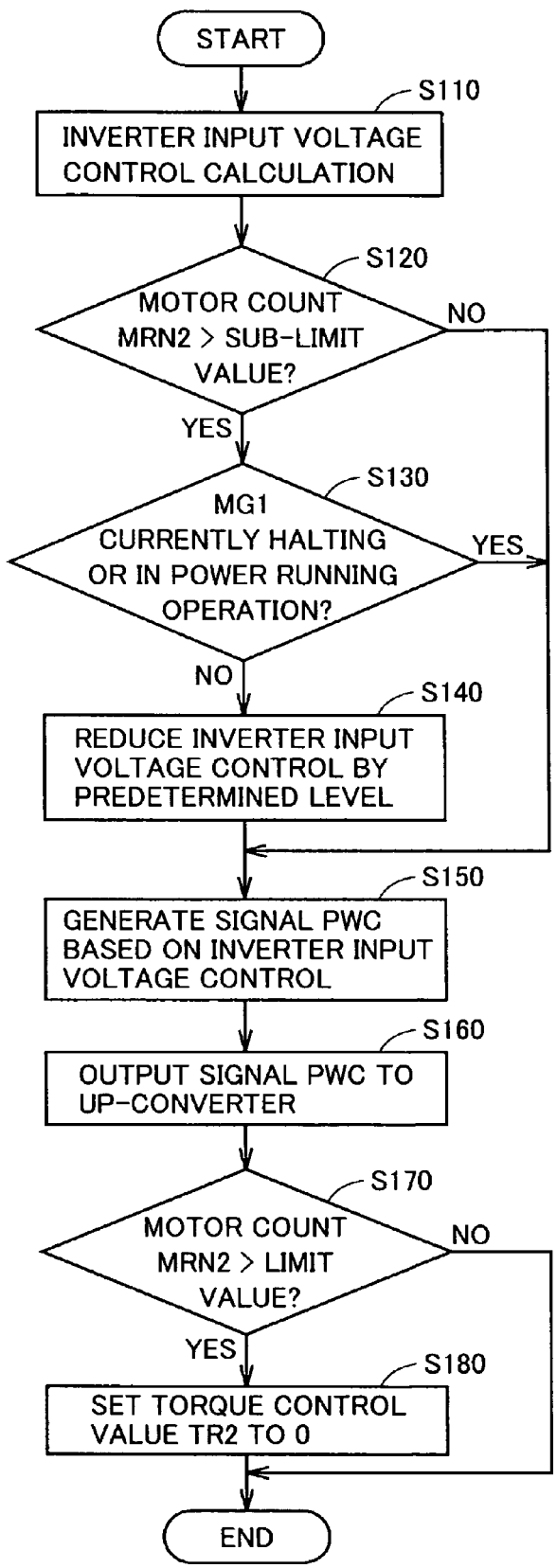
FIG. 6 is a flow chart related to abnormality processing when excessive rotation occurs at motor generator MG2 according to a second embodiment of the present invention.

FIG. 6 is a flow chart related to abnormality processing when excessive rotation of motor generator MG2 occurs in accordance with the second embodiment of the present invention. Referring to FIG. 6, converter control unit 42A calculates voltage control Vcom of input voltage VM of inverters 20 and 30 based on torque control values TR1 and TR2, and motor counts MRN1 and MRN2 from revolution sensors 56 and 58 (step S110).

Abnormality processing control unit 48A determines whether motor count MRN2 of motor generator MG2 exceeds the preset sub-limit value (step S120). When determination is made that motor count MRN2 is equal to or lower than the sub-limit value (NO at step S120), control proceeds to step S150 that will be described afterwards.

When determination is made that motor count MRN2 exceeds the sub-limit value at step S120 (YES at step S120), abnormality processing control unit 48A determines whether motor generator MG1 is currently halting or in a power running operation based on signal REG (step S130). When motor generator MG1 is not currently halting or not in a power running operation, i.e. determination is made of being in a regenerative power generation mode (NO at step S130), abnormality processing control unit 48A outputs control signal CTL1 of an H level to converter control unit 42. Accordingly, converter control unit 42 reduces voltage control Vcom of inverter input voltage VM by a predetermined level in response to control signal CTL1 of an H level (step S140).

When determination is made that motor generator MG1 is currently halting or in a power running operation at step S130 (YES at step S130), step S140 set forth above is bypassed, and control proceeds to step S150 that will be described afterwards. Therefore, when motor generator MG1 is currently halting or in a power running operation, voltage control Vcom of inverter input voltage VM is not reduced and is maintained at the level of voltage control Vcom calculated at step S110.

Converter control unit 42 generates a signal PWC to turn on/off power transistors Q1 and Q2 of up-converter 10 based on voltage control Vcom calculated at step S110 or voltage control Vcom reduced at step S140 (step S150). The generated signal PWC is output to power transistors Q1 and Q2 of up-converter 10 (step S160).

Then, abnormality processing control unit 48A determines whether motor count MRN2 of motor generator MG2 exceeds the limit value that is higher than the sub-limit value (step S170). When determination is made that motor count MRN2 exceeds the limit value (YES at step S170), abnormality processing control unit 48A outputs control signal CTL2 of an H level to second inverter control unit 46. Accordingly, second inverter control unit 46 generates signal PWM2 with torque control value TR2 as zero in response to control signal CTL2 of an H level. When determination is made that motor count MRN2 is at most the limit value at step S170 (NO at step S170), the series of procedures ends.

In accordance with the second embodiment set forth above, the boosting rate of up-converter 10 is not reduced when motor generator MG1 is currently halting or in a power running operation. In other words, the boosting rate of up-converter 10 is maintained when motor generator MG1 is currently halting or in a power running operation since voltage increase at power supply line PL2 does not occur. Therefore, unnecessary voltage variation at power supply line PL2 is suppressed.

Overvoltage at power supply line PL2 can be completely eliminated since the boosting rate of up-converter 10 is reduced in advance prior to execution of torque reduction control of motor generator MG2. Thus, thorough protection against inverter overvoltage is achieved.

Third Embodiment

Although torque reduction control of motor generator MG2 is executed in response to excessive rotation at motor generator MG2, the rise of voltage VM reflecting torque reduction at motor generator MG2 is small in the case where the power consumption of motor generator MG2, immediately before execution of torque reduction control, is small. In the third embodiment, the boosting rate of up-converter 10 is reduced only in the case where the power consumed by motor generator MG2 exceeds a preset threshold value when excessive rotation occurs at motor generator MG2.

A hybrid vehicle 100B incorporating the load driving apparatus of the third embodiment is based on the configuration of hybrid vehicle 100 of the first embodiment shown in FIG. 1, and includes an ECU 40B instead of ECU 40.

Figure 7:
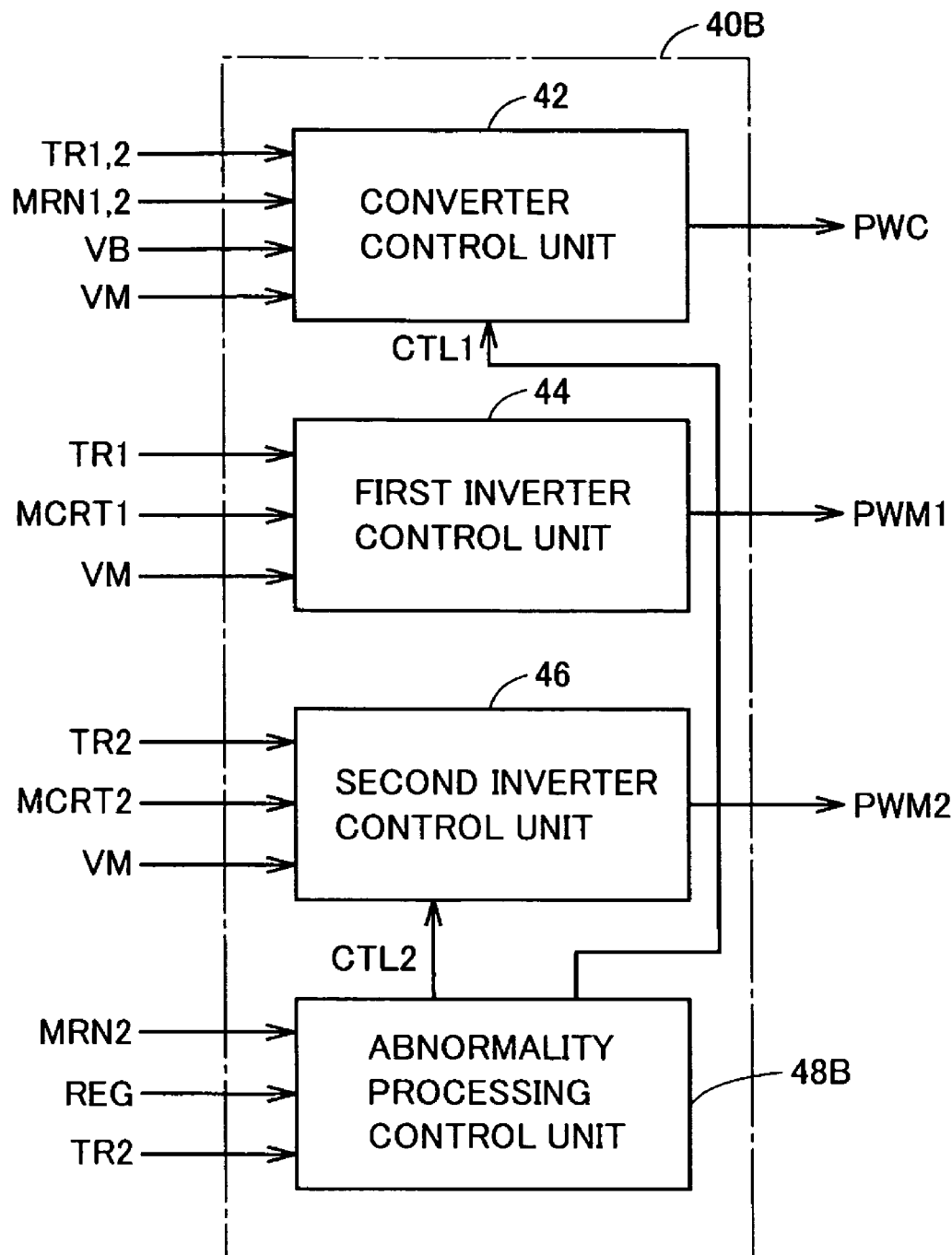
FIG. 7 is a functional block diagram of an ECU according to a third embodiment of the present invention.

FIG. 7 is a functional block diagram of ECU 40B according to the third embodiment of the present invention. Referring to FIG. 7, ECU 40B is based on the configuration of ECU 40A of the second embodiment, and includes an abnormality processing control unit 48B instead of abnormality processing control unit 48A.

Abnormality processing control unit 48B compares motor count MRN2 from revolution sensor 58 with a preset sub-limit value. Abnormality processing control unit 48B calculates the power consumed by motor generator MG2 based on torque control value TR2 and motor count MRN2 of motor generator MG2. The calculated power consumed by motor generator MG2 is compared with a preset threshold value. In the case where the power consumed by motor generator MG2 exceeds the threshold value when motor count MRN2 of motor generator MG2 exceeds the sub-limit value, abnormality processing control unit 48B outputs to converter control unit 42 control signal CTL1 of an H level directed to reducing the boosting rate of up-converter 10. In other words, in the case where the power consumed by motor generator MG2 is equal to or lower than the threshold value when motor count MRN2 of motor generator MG2 exceeds the sub-limit value, control signal CTL1 of an L level is output to converter control unit 42.

The threshold value of power consumption by motor generator MG2 qualified as the criterion to determine whether to instruct reduction in the boosting rate of up-converter 10 is determined from the standpoint of whether overvoltage is generated at power supply line PL2 reflecting torque reduction control of motor generator MG2.

The remaining functions of abnormality processing control unit 48B are similar to those of abnormality processing control unit 48A described in the second embodiment.

Figure 8:
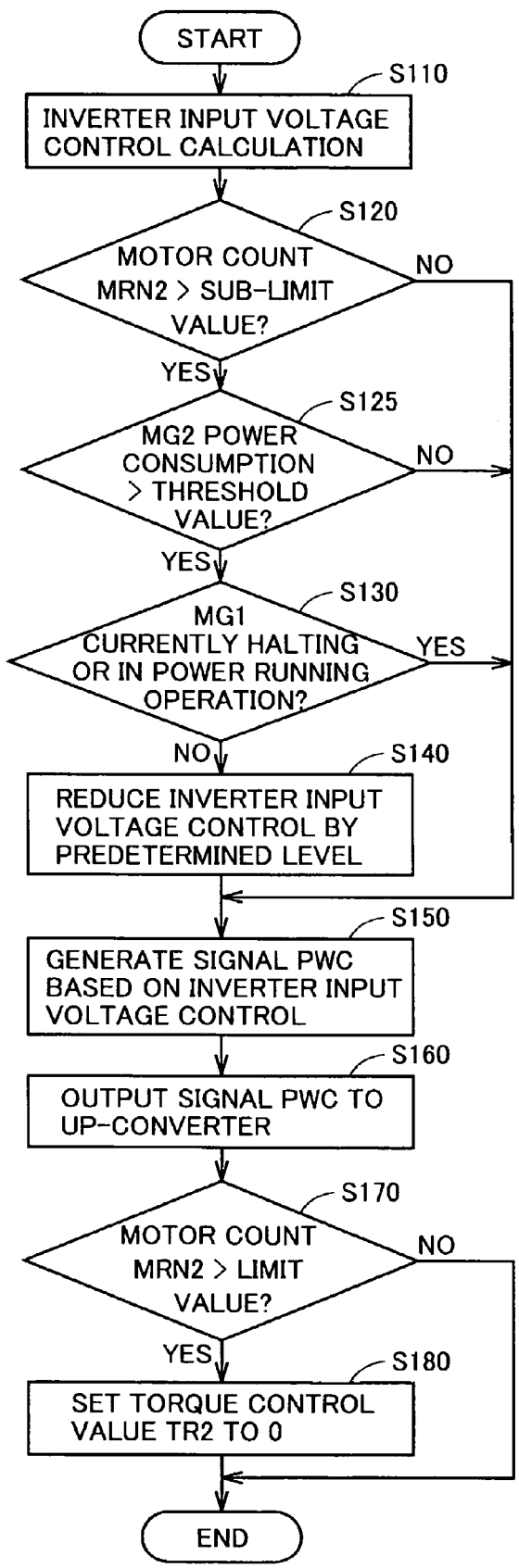
FIG. 8 is a flow chart related to abnormality processing when excessive rotation occurs at motor generator MG2 according to the third embodiment of the present invention.

FIG. 8 is a flow chart related to abnormality processing when excessive rotation of motor generator MG2 occurs in the third embodiment of the present invention. Referring to FIG. 8, the procedure indicated by this flow chart further includes step S125 in the series of procedures shown in FIG. 6. Specifically, when determination is made that motor count MRN2 of motor generator MG2 exceeds the sub-limit value at step S120 (YES at step S120), abnormality processing control unit 48B estimates the power consumed by motor generator MG2 based on torque control value TR2 and motor count MRN2 of motor generator MG2, and determines whether the power consumed by motor generator MG2 exceeds the preset threshold value (step S125).

When abnormality processing control unit 48B determines that the power consumption of motor generator MG2 is equal to or lower than the threshold value (NO at step S125), control proceeds to step S150. Since the procedure of step S140 is not executed in this case, voltage control Vcom of inverter input voltage VM is maintained without being reduced.

When determination is made that the power consumed by motor generator MG2 exceeds the threshold value at step S125 (YES at step S215), control proceeds to step S130. In this case, voltage control Vcom of inverter input voltage VM is reduced when determination is made that motor generator MG1 is in a regenerative power generation mode at step S130 (step S140).

Figure 9:
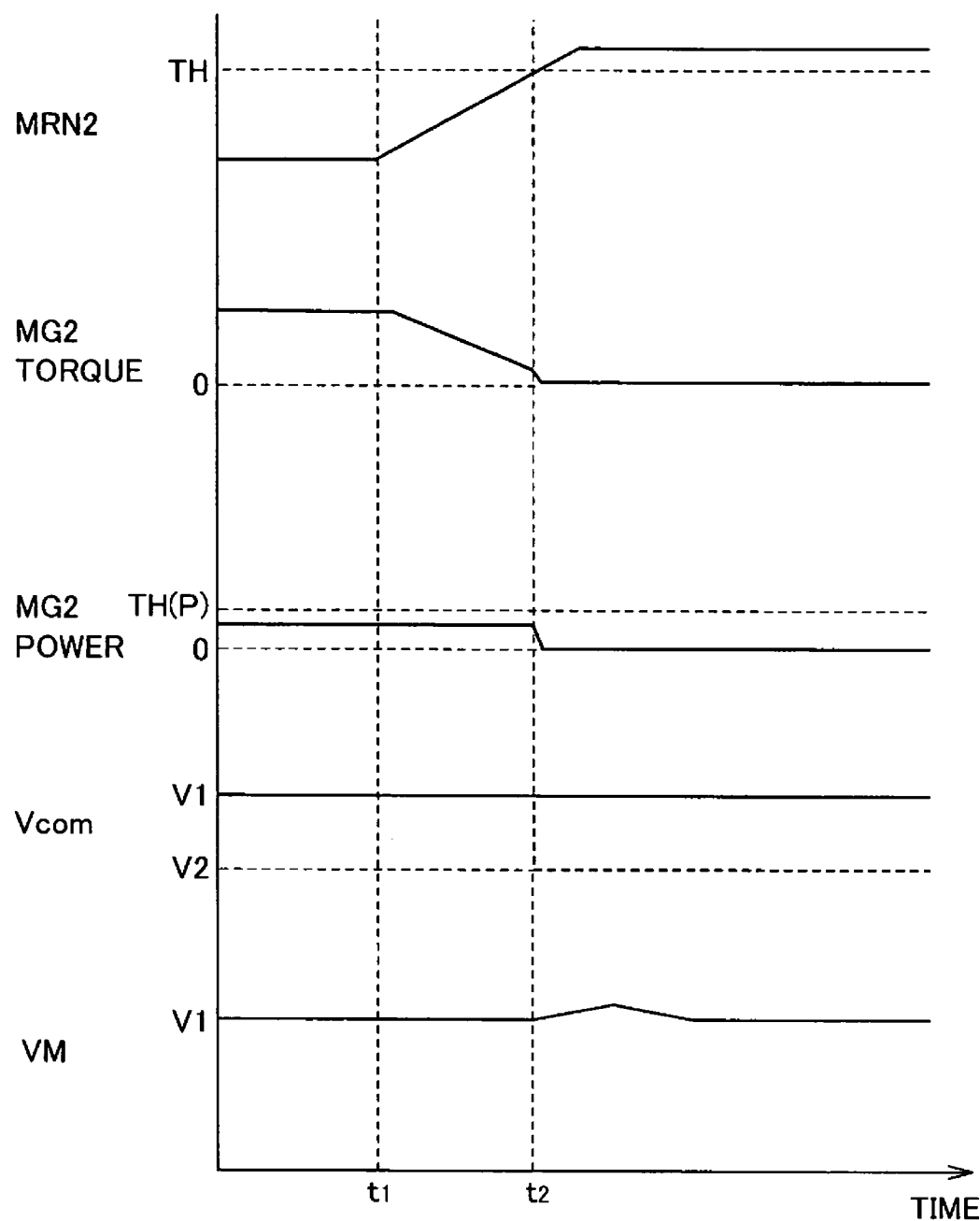
FIG. 9 is an operation waveform diagram when excessive rotation occurs at motor generator MG2.

FIG. 9 is an operation waveform diagram when excessive rotation of motor generator MG2 occurs. Description is provided based on the case where the sub-limit value of motor count MRN2 of motor generator MG2 is equal to the limit value in FIG. 9. When motor count MRN2 of motor generator MG2 begins to increase by a failure, for example, at the clutch of transmission TM at time t1 in FIG. 9, the torque of motor generator MG2 begins to decrease accordingly.

When motor count MRN2 exceeds a predetermined limit value TH at time t2, torque control value TR2 of motor generator MG2 is set to 0, whereby the torque of motor generator MG2 rapidly approaches zero.

In view of the supposed rise of voltage VM on power supply line PL2 in response to an abrupt decrease of the torque of motor generator MG2, determination is made that the rise of voltage VM is small since the power consumed by motor generator MG2 (MG2 power) at time t2 is lower than the preset threshold value TH (P). Therefore, voltage control Vcom is maintained at V1.

At time t2 onward, although voltage VM will rise in response to the torque of motor generator MG2 abruptly attaining the level of zero, this rise is not of an extent that will bring voltage VM as high as the level of overvoltage that exceeds the breakdown voltage of inverters 20 and 30 since the power consumed by motor generator MG2 at the time of torque reduction at motor generator MG2 is small at time t2.

When excessive rotation of motor generator MG2 occurs in the third embodiment, the boosting rate of up-converter 10 is reduced only in the case where the power consumed by motor generator MG2 exceeds a preset threshold value. In other words, even if excessive rotation of motor generator MG2 occurs and torque restriction control of motor generator MG2 is executed, the boosting rate of up-converter 10 is maintained since a voltage increase as high as overvoltage at power supply line PL2 will not occur when the power consumed by motor generator MG2 is equal to or less than the threshold value. In accordance with the third embodiment, unnecessary variation in the voltage level of power supply line PL2 can be prevented.

First Modification of Third Embodiment

When excessive rotation of motor generator MG2 occurs, the boosting rate of up-converter 10 can be reduced only in the case where the torque of motor generator MG2 exceeds a preset threshold value.

Figure 10:
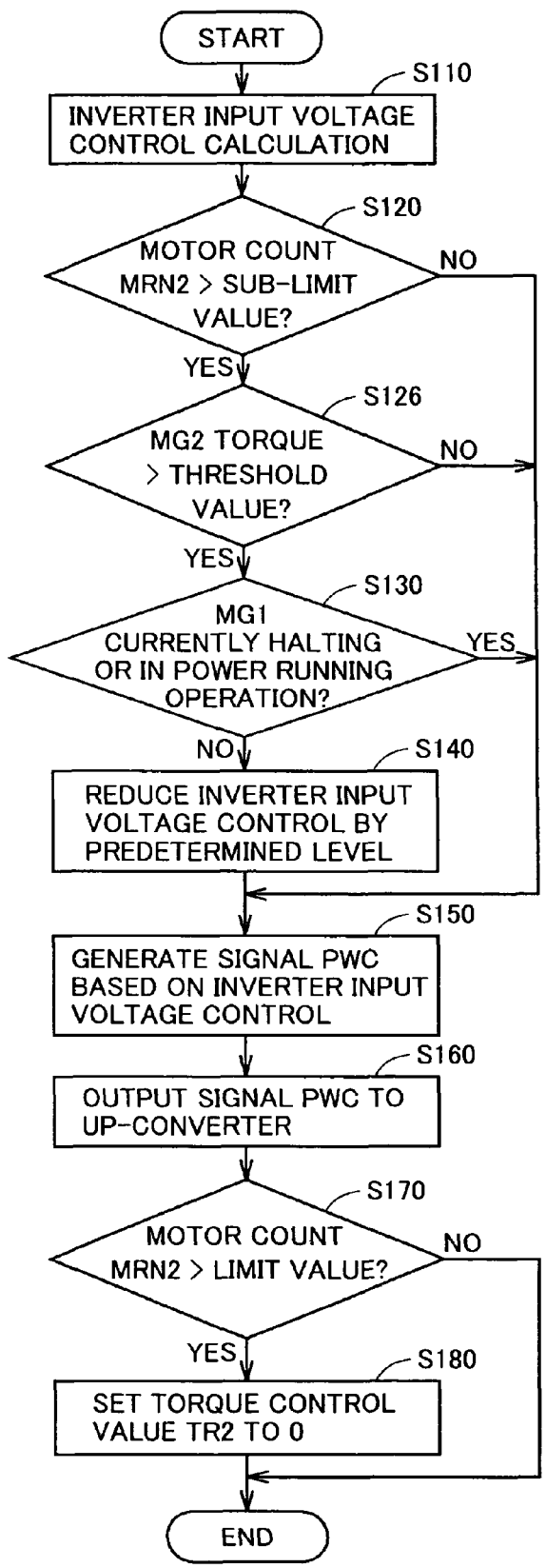
FIG. 10 is a flow chart related to abnormality processing when excessive rotation occurs at motor generator MG2 according to a first modification of the third embodiment of the present invention.

FIG. 10 is a flow chart related to abnormality processing when excessive rotation occurs at motor generator MG2 according to the first modification of the third embodiment of the present invention. Referring to FIG. 10, the procedure in this flow chart is based on the series of procedures shown in FIG. 8, and includes step S126 instead of step S125. Specifically, when determination is made that motor count MRN2 of motor generator MG2 exceeds the sub-limit value at step S120 (YES at step S120), abnormality processing control unit 48B determines whether torque control value TR2 of motor generator MG2 exceeds a preset threshold value (step S126).

When determination is made that torque control value TR2 of motor generator MG2 exceeds the threshold value at step S126 (YES at step S126), control proceeds to step S130. When determination is made that torque control value TR2 of rotor generator MG2 is equal to or lower than the threshold value at step S126 (NO at step S126), control bypasses step S140 to proceed to step S150.

When excessive rotation at motor generator MG2 occurs and torque restriction control of motor generator MG2 is executed, the boosting rate of up-converter 10 is maintained since a voltage increase as high as overvoltage at power supply line PL2 will not occur in the case where the torque of motor generator MG2 is equal to or lower than the threshold value. Therefore, unnecessary variation of the voltage level at power supply line PL2 can be prevented.

The threshold value of the torque of motor generator MG2 qualified as the criterion to determine whether to instruct reduction in the boosting rate of up-converter 10 can be determined from the standpoint of whether overvoltage occurs at power supply line PL2 reflecting the torque reduction control of motor generator MG2.

The above description is based on torque control value TR2 of motor generator MG2 compared with a threshold value. Alternatively, the torque of motor generator MG2 can be detected by a torque sensor, or the torque of motor generator MG2 can be calculated based on the motor current of motor generator MG2, and then the detected or calculated torque results of motor generator MG2 can be compared with the threshold value.

Second Modification of Third Embodiment

When excessive rotation of motor generator MG2 occurs, the boosting rate of up-converter 10 can be reduced only in the case where a motor current MCRT2 of motor generator MG2 exceeds a preset threshold value.

Figure 11:
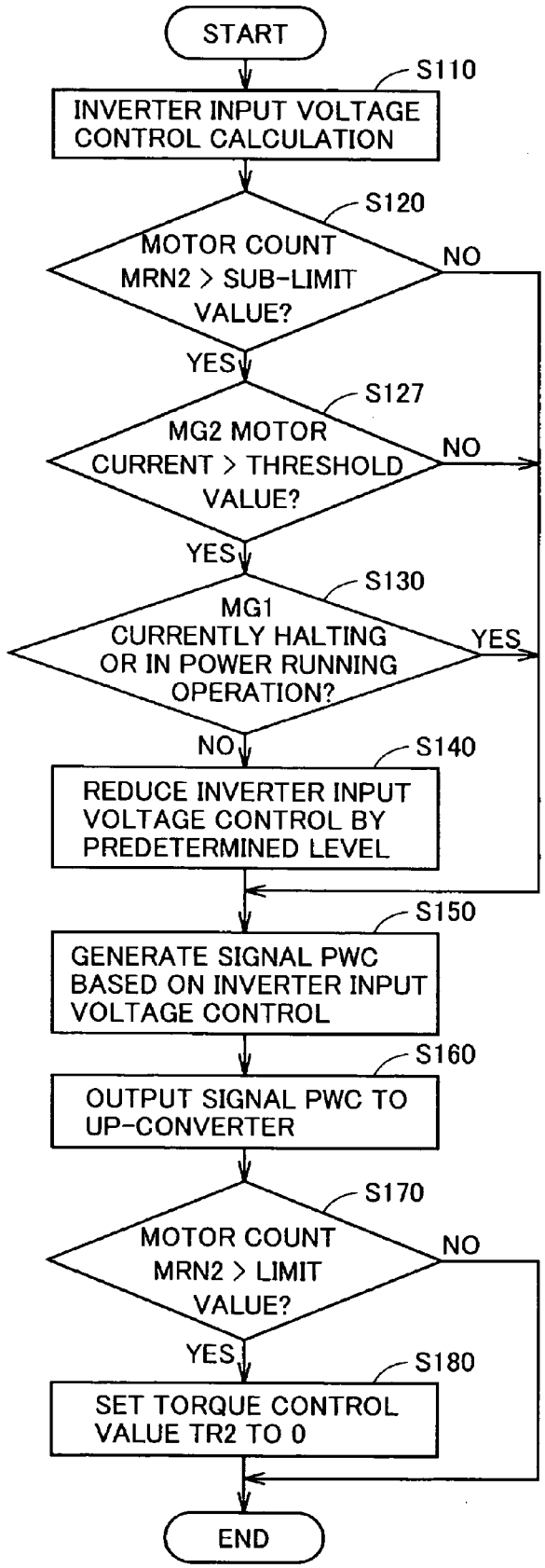
FIG. 11 is a flow chart related to abnormality processing when excessive rotation occurs at motor generator MG2 according to a second modification of the third embodiment of the present invention.

FIG. 11 is a flow chart related to abnormality processing when excessive rotation occurs at motor generator MG2 according to the second modification of the third embodiment of the present invention. Referring to FIG. 11, the procedure indicated in the flow chart is based on the series of procedures of FIG. 8, and includes step S127 instead of step S125. Specifically, when determination is made that motor count MRN2 of motor generator MG2 exceeds the sub-limit value at step S120 (YES at step S120), abnormality processing control unit 48B determines whether motor current MCRT2 of motor generator MG2 exceeds a preset threshold value or not (step S127).

When determination is made that motor current MCRT2 of motor generator MG2 exceeds the threshold value at step S127 (YES at step S127), control proceeds to step S130. When determination is made that motor current MCRT2 of motor generator MG2 is equal to or lower than the threshold value at step S127 (NO at step S127), control bypasses step S140 to proceed to step S150.

Even when excessive rotation occurs at motor generator MG2 and torque restriction control of motor generator MG2 is executed, the boosting rate of up-converter 10 is maintained since a voltage increase as high as overvoltage on power supply line PL2 will not occur when the current flowing through motor generator MG2 is equal to or less than the threshold value. Therefore, unnecessary variation in the voltage level of power supply line PL2 can be prevented in accordance with the second modification of the third embodiment.

The threshold value of the motor current of motor generator MG2 qualified as the criterion to determine whether to instruct reduction in the boosting rate of up-converter 10 is determined from the standpoint of whether overvoltage occurs at power supply line PL2 reflecting the torque reduction control of motor generator MG2.

The above description of the third embodiment and the first and second modifications thereof is based on a procedure in which the procedure executed by step S125, S126, or S127 is added to the series of procedures of the second embodiment shown in FIG. 6. Additionally, a procedure corresponding to step S125, S126, or S127 may be added to the series of procedures of the first embodiment shown in FIG. 4. Specifically, a procedure corresponding to step S125, S126, or S127 is added between the procedure executed by step S20 and the procedure executed by step S40 in the series of procedures of FIG. 4, such that control proceeds to step S50 without executing step S40 when the power consumption, torque, or current of motor generator MG2 is equal to or lower than the threshold value.

Each of the above embodiments was described in which the boosting rate of up-converter 10 is reduced by decreasing voltage control Vcom of voltage VM relatively lower than the current value by a predetermined level. Alternatively, the boosting rate of up-converter 10 can be reduced by decreasing voltage control Vcom to a predetermined value that is set in advance.

Each of the above embodiments has been described in which hybrid vehicle 100, 100A, or 100B incorporates a transmission TM, failure of which causes excessive rotation of motor generator MG2. The present invention can also be applied to a hybrid vehicle that does not incorporate a transmission TM. In other words, the present invention can be applied irrespective of the generating cause of the excessive rotation of motor generator MG2.

Although battery B in each of the embodiments set forth above is described as a chargeable secondary battery, a fuel cell may also be employed. A fuel cell is a DC power-generating cell that obtains electric energy from chemical reaction energy caused by chemical reaction between the fuel such as hydrogen and an oxidizing agent. Alternatively, a capacitor of a large capacitance can be employed instead of battery B.

In the above description, motor generator MG2 corresponds to "first rotating electric machine" of the present invention. Inverter 30 corresponds to "first driving device" of the present invention. Further, motor generator MG1 and inverter 20 correspond to "power generation means" of the present invention. Motor generator MG1 corresponds to "second rotating electric machine" of the present invention, and inverter 20 corresponds to "second driving device" of the present invention. Further, up-converter 10 corresponds to "up-conversion device" of the present invention. ECUs 40, 40A and 40B correspond to "control device" of the present invention. Further, driving wheel DW corresponds to "wheel" of the present invention, and engine ENG corresponds to "internal combustion engine" of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A load driving apparatus, comprising:
a first rotating electric machine generating a drive force,
a first driving device arranged between a first power supply line and said first rotating electric machine, driving said first rotating electric machine with supply of power from said first power supply line,
power generation means connected to said first power supply line for supplying generated power to said first power supply line,
an up-conversion device arranged between a second power supply line connected to a DC power source and said first power supply line, boosting voltage of said second power supply line for output to said first power supply line, and
control means for outputting an instruction to reduce a torque generated by said first rotating electric machine to said first driving device when a revolution count of said first rotating electric machine exceeds a predetermined limit value,
wherein said control means outputs, to said up-conversion device, an instruction to reduce a boosting rate of said up-conversion device when the revolution count of said first rotating electric machine exceeds a predetermined sub-limit value that is at most said predetermined limit value,
wherein said power generation means includes
a second rotating electric machine having a power generation function, and
a second driving device arranged between said first power supply line and said second rotating electric machine, driving said second rotating electric machine,
wherein said control means maintains the boosting rate of said up-conversion device without outputting, to said up-conversion device, said instruction to reduce the boosting rate of said up-conversion device in a case where said second rotating electric machine is currently halting or in a power running operation when the revolution count of said first rotating electric machine exceeds said predetermined sub-limit value.

2. The load driving apparatus according to claim 1, wherein said control means outputs to said first driving device an instruction to set the torque generated by said first rotating electric machine to zero when the revolution count of said first rotating electric machine exceeds said predetermined limit value.

3. The load driving apparatus according to claim 1, wherein said control means outputs said instruction to reduce said boosting rate of said up-conversion device in a case where power consumed by said first rotating electric machine exceeds a first threshold value when the revolution count of said first rotating electric machine exceeds said predetermined sub-limit value.

4. The load driving apparatus according to claim 1, wherein said control means outputs said instruction to reduce said boosting rate of said up-conversion device in a case where the torque of said first rotating electric machine exceeds a second threshold value when the revolution count of said first rotating electric machine exceeds said predetermined sub-limit value.

5. The load driving apparatus according to claim 1, wherein said control means outputs said instruction to reduce said boosting rate of said up-conversion device in a case where current flowing through said first rotating electric machine exceeds a third threshold value when the revolution count of said first rotating electric machine exceeds said predetermined sub-limit value.

6. A vehicle comprising:
the load driving apparatus defined in claim 1,
a wheel driven by a drive force generated by said first rotating electric machine, and
an internal combustion engine arranged connectable to said second rotating electric machine, outputting a rotation force to said second rotating electric machine, as necessary, when connected to said second rotating electric machine.

7. The load driving apparatus according to claim 1, wherein said control means outputs to said first driving device an instruction to set the torque generated by said first rotating electric machine to zero when the revolution count of said first rotating electric machine exceeds said predetermined limit value.

8. An abnormality processing method at a load driving apparatus,
said load driving apparatus including
a first rotating electric machine generating a drive force,
a first driving device arranged between a first power supply line and said first rotating electric machine, driving said first rotating electric machine with supply of power from said first power supply line,
power generation means connected to said first power supply line for supplying generated power to said first power supply line, and
an up-conversion device arranged between a second power supply line connected to a DC power source and said first power supply line, boosting voltage of said second power supply line for output to said first power supply line,
said abnormality processing method comprising:
a first step of determining whether a revolution count of said first rotating electric machine exceeds a predetermined sub-limit value,
a second step of generating an instruction to reduce a boosting rate of said up-conversion device when determination is made that the revolution count of said first rotating electric machine exceeds said predetermined sub-limit value,
a third step of controlling the boosting rate of said up-conversion device based on the instruction generated at said second step,
a fourth step of determining whether the revolution count of said first rotating electric machine exceeds a predetermined limit value that is at least said predetermined sub-limit value,
a fifth step of generating an instruction to reduce a torque generated by said first rotating electric machine when determination is made that the revolution count of said first rotating electric machine exceeds said predetermined limit value, and a sixth step of controlling the torque of said first rotating electric machine based on the instruction generated at said fifth step.

9. The abnormality processing method according to claim 8, wherein said power generation means includes a second rotating electric machine having a power generation function, and a second driving device arranged between said first power supply line and said second rotating electric machine, driving said second rotating electric machine, said abnormality processing method further comprising a seventh step of determining whether said second rotating electric machine is currently halting or in a power running operation when determination is made that the revolution count of said first rotating electric machine exceeds said predetermined sub-limit value at said first step, and bypassing said second and third steps when determination is made that said second rotating electric machine is currently halting or in the power running operation.

10. The abnormality processing method according to claim 9, wherein, in said fifth step, an instruction to set the torque generated by said first rotating electric machine to zero is generated when determination is made that the revolution count of said first rotating electric machine exceeds said predetermined limit value at said fourth step.

11. The abnormality processing method according to claim 8, wherein, in said fifth step, an instruction to set the torque generated by said first rotating electric machine to zero is generated when determination is made that the revolution count of said first rotating electric machine exceeds said predetermined limit value at said fourth step.

12. The abnormality processing method according to claim 8, further comprising an eighth step of determining whether power consumed by said first rotating electric machine exceeds a first threshold value, wherein, in said second step, the instruction to reduce said boosting rate is generated in a case where determination is made that the power consumed by said first rotating electric machine exceeds said first threshold value at said eighth step when determination is made that the revolution count of said first rotating electric machine exceeds said predetermined sub-limit value.

13. The abnormality processing method according to claim 8, further comprising a ninth step of determining whether the torque of said first rotating electric machine exceeds a second threshold value, wherein, in said second step, the instruction to reduce said boosting rate is generated in a case where determination is made that the torque of said first rotating electric machine exceeds said second threshold value at said ninth step when determination is made that the revolution count of said first rotating electric machine exceeds said predetermined sub-limit value.

14. The abnormality processing method according to claim 8, further comprising a tenth step of determining whether current flowing through said first rotating electric machine exceeds a third threshold value, wherein, in said second step, the instruction to reduce said boosting rate is generated in a case where determination is made that the current flowing through said first rotating electric machine exceeds said third threshold value at said tenth step when determination is made that the revolution count of said first rotating electric machine exceeds said predetermined sub-limit value.

* * * * *

UNITED STATES PATENT AND TRADEMARK OFFICE
CERTIFICATE OF CORRECTION

| | |
|---|---|
| PATENT NO. | : 7,834,578 B2 |
| APPLICATION NO. | : 11/547044 |
| DATED | : November 16, 2010 |
| INVENTOR(S) | : Ryoji Sato |

It is certified that error appears in the above-identified patent and that said Letters Patent is hereby corrected as shown below:

| | Column | Line | |
|---|---|---|---|
| | 10 | 24 | Change "up-converter1O" to --up-converter 10--. |
| | 17 | 26 | Change "rotor generator" to --motor generator--. |
| Claim 10 | 21 | 24 | Change "9, wherein" to --8, wherein--. |

Page 1 of 1

Signed and Sealed this
Twelfth Day of April, 2011

David J. Kappos
*Director of the United States Patent and Trademark Office*